US009039235B2

(12) United States Patent
Xu et al.

(10) Patent No.: US 9,039,235 B2
(45) Date of Patent: May 26, 2015

(54) LASER LINE GENERATING DEVICE

(71) Applicant: Chervon (HK) Limited, Wanchai (HK)

(72) Inventors: Ping Xu, Nanjing (CN); Ming Chen, Nanjing (CN)

(73) Assignee: Chervon (HK) Limited, Hong Kong (HK)

( * ) Notice: Subject to any disclaimer, the term of this patent is extended or adjusted under 35 U.S.C. 154(b) by 73 days.

(21) Appl. No.: 14/024,034

(22) Filed: Sep. 11, 2013

(65) Prior Publication Data

US 2014/0078742 A1 Mar. 20, 2014

(30) Foreign Application Priority Data

Sep. 19, 2012 (CN) .......................... 2012 1 0347605

(51) Int. Cl.
*G02B 27/20* (2006.01)
*F21V 5/02* (2006.01)
*G01C 5/00* (2006.01)
*G01C 15/00* (2006.01)

(52) U.S. Cl.
CPC ... *F21V 5/02* (2013.01); *G01C 5/00* (2013.01); *G01C 15/00* (2013.01)

(58) Field of Classification Search
CPC ............. F21V 5/02; F21V 7/041; F21K 9/00; G01C 5/00; G01C 15/00
USPC ........................................................ 362/259
See application file for complete search history.

(56) References Cited

U.S. PATENT DOCUMENTS

2004/0107588 A1* 6/2004 Pu ................................... 33/286

* cited by examiner

*Primary Examiner* — Jason Moon Han
(74) *Attorney, Agent, or Firm* — Greenberg Traurig, LLP

(57) ABSTRACT

A laser line generating device includes a conical prism, a light-emitting unit for projecting light onto the conical prism, a housing for receiving the light-emitting unit and permitting the light emitted by the light-emitting unit to pass there through, and translucent columns disposed between the housing and the conical prism for connecting the housing and the conical prism, wherein the apex of the conical prism faces towards the light-emitting unit.

11 Claims, 1 Drawing Sheet

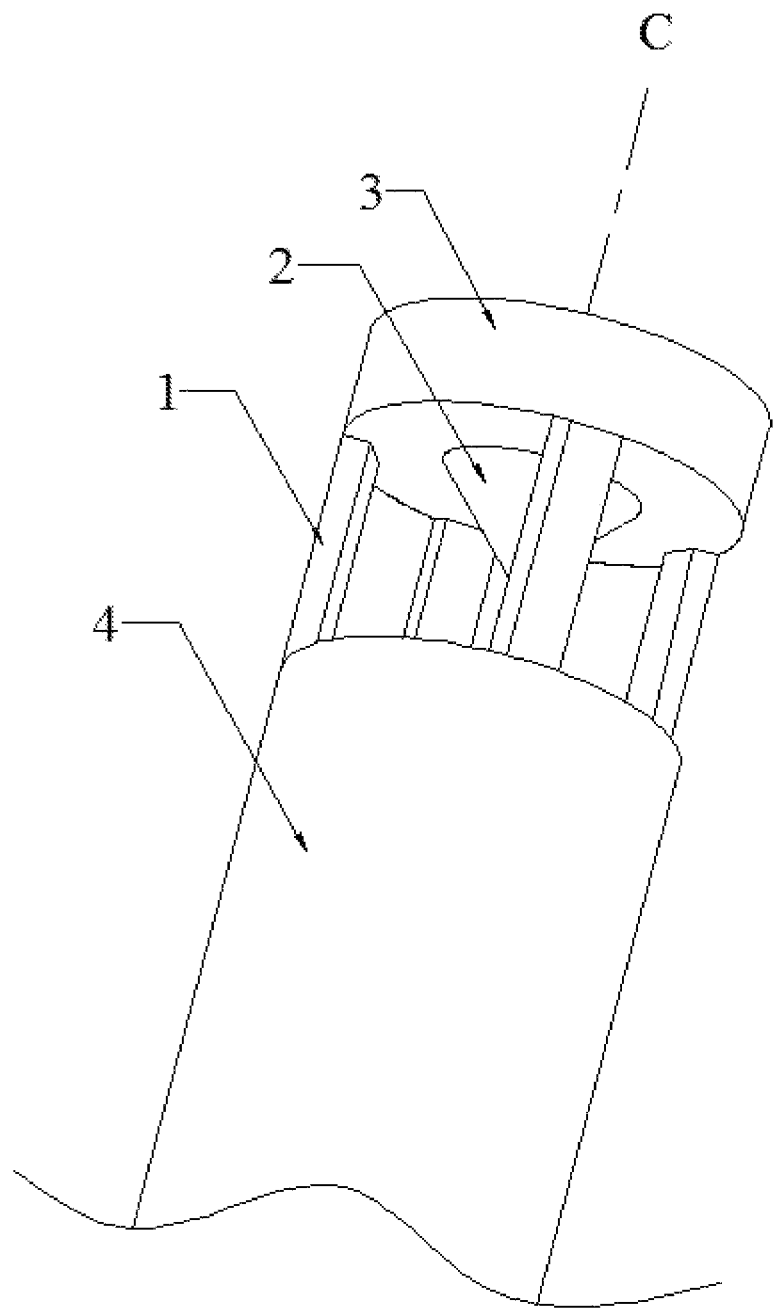

LASER LINE GENERATING DEVICE

RELATED APPLICATION INFORMATION

This application claims the benefit of CN 201210347605.9, filed on Sep. 9, 2012, the disclosure of which is incorporated herein by reference in its entirety.

FIELD OF THE DISCLOSURE

The present disclosure relates to a laser level and, more particularly, to a laser line generating device, which belongs to the field of surveying instruments.

BACKGROUND

A laser level is generally an instrument which can emit a vertical or horizontal visible laser to label a vertical or horizontal line on an objective surface. A laser level utilizes a light reflection principle to project a parallel light beam onto a conical prism, and the parallel light beam will form a 360-degree beam in the space after being reflected. The 360-degree beam can be used in the field of surveying instruments to mark the line. However, the support problem of the conical prism has not been solved better so far. Specifically, the disadvantage of the known method for supporting the conical prism lies in that the light reflected by the conical prism is always blocked, so that the light for measuring is discontinuous and using the beam to take measurements is inconvenient.

SUMMARY

In order to solve the disadvantages in the prior art, an objective of the present disclosure is to provide a laser line generating device which can effectively solve the problem on the support of the conical prism.

In order to obtain the foregoing objective, the present disclosure provides the following technical solution:

A laser line generating device is disclosed which includes: a conical prism, a light-emitting unit for projecting light onto the conical prism, a housing for receiving the light-emitting unit through which is passed the light emitted by the light-emitting unit, and translucent columns disposed between the housing and the conical prism for connecting the housing and the conical prism, wherein the apex of the conical prism faces towards the light-emitting unit.

The advantages of the present disclosure lie in that: the subject device utilizes the translucent columns to support the conical prism, which can effectively prevent the light-blocking problem existing in the known supporting means; the translucent columns according to the present disclosure can be manufactured simply and can not only easily ensure the parallelism of the translucent columns, but also effectively ensure the accuracy of the laser line.

BRIEF DESCRIPTION OF DRAWINGS

FIG. 1 is a schematic cross-sectional view of the laser line generating device according to the preferred embodiment of the invention.

DETAILED DESCRIPTION OF PREFERRED EMBODIMENTS

Next, an exemplary embodiment will be further described with reference to the drawings.

FIG. 1 is a schematic cross-sectional view of the laser line generating device according to the preferred embodiment. As shown in FIG. 1, the laser line generating device according to the illustrated embodiment includes a light-emitting unit, a housing 4, a prism holder 3, a conical prism 2 and translucent columns 1. The light-emitting unit is used to emit a laser light source needed for generating laser line.

In order to protect the light-emitting unit, the housing 4 is provided, in which the light-emitting unit is disposed. It should be noted that, in order to utilize the laser light generated by the light-emitting unit, the housing 4 is provided with a corresponding optical system therein. Moreover, with respect to the structure of the housing 4, the housing 4 should enable the laser light to be transmitted there through to the conical prism 2. The housing 4 may be opened at one end or configured as other structures, which can be easily achieved by those skilled in the art, therefore it is unnecessary to go into further details herein.

The prism holder 3 and the conical prism 2 are disposed on one side of the housing 4 from which the laser beam is transmitted. The conical prism 2 is a reflector prism having a conical prism surface for reflecting the laser beam, and the apex of the conical prism 2 faces towards the light-emitting unit. When in use, the laser beam generated by the light-emitting unit is projected on the conical prism 2 by appropriate adjustment, and then reflected to form a 360-degree reflected light which can be used for projecting lines on walls or other objects.

Ideally there is no object between the housing 4 and the prism holder 3 to block the light, but the housing 4 and the prism holder 3 still need to be connected together in order to be formed as a whole.

In the preferred embodiment, to achieve a stable connection as well as the minimum obstruction of the light, more than one translucent column 1 is provided between the prism holder 3 and the housing 4. Since the conical prism 2 and the prism holder 3 respectively have a certain weight per se, and the conical prism 2 is a relatively important part in the laser level, in order to ensure the structural strength, it is appropriate that the number and size of the translucent columns 1 shall be suitable for the stable connection and the support thereof. Preferably, the number of the translucent columns 1 can be chosen as an even number. Moreover, the translucent columns 1 can be disposed in a symmetrical manner. Further, as a preferred embodiment, the translucent columns 1 can be symmetrically disposed relative to the center of the conical prism 2, and the number of the translucent columns 1 is four.

With respect to the translucent columns 1, in order to achieve the minimum obstruction of the light, the translucent columns 1 are made by optical glass. The optical glass referred to herein is colorless optical glass in a narrow sense, with this kind of optical glass having high transmittance such that the light can be transmitted to the greatest extent. Specifically, the optical glass according to the present disclosure is preferably chosen as flint glass having a high refractive index and high dispersion, such as K9, which is of high Modulus of Elasticity (MOE) and large density, wherein the MOE is larger than 70 GPa.

Referring to FIG. 1, with respect to the shape of the translucent columns 1, as a preferred embodiment, the translucent columns 1 are configured as rectangular blocks. If the translucent columns 1 are rectangular blocks, the surface with the maximum area of the translucent column 1 is parallel to the central axis C of the conical prism 2, and the surface with the minimum area of the translucent column 1 is perpendicular to the central axis C of the conical prism 2. In addition, to minimize the impact of the translucent column 1 on the light, it is desired that the translucent columns 1 are disposed far away from the conical prism 2. Therefore, as a preferred embodiment, the translucent columns 1 are located at the edge of the prism holder 3.

Moreover, as a preferred embodiment, in order to accommodate the 360-degree projection and facilitate the disposition of the translucent columns 1, the prism holder 3 is a cylinder and the housing 4 is a cylinder concentric with the prism holder 3.

The basic principle, principal characters and advantages of the present disclosure have been illustrated and described above. It should be noted that the foregoing embodiments shall not limit the present disclosure in any form, and all the technical solutions as a result of equivalent substitutions or modifications shall come into the scope of the present disclosure.

What is claimed is:

1. A laser line generating device, comprising:
    a conical prism;
    a light-emitting unit for projecting light onto the conical prism;
    a housing for carrying the light-emitting unit and permitting light emitted by the light-emitting unit to be passed there through towards the conical prism; and
    translucent columns disposed between the housing and the conical prism for connecting the housing and the conical prism, wherein the apex of the conical prism faces towards the light-emitting unit.

2. The laser line generating device according to claim 1, wherein the translucent columns are symmetrically disposed relative to the center of the conical prism.

3. The laser line generating device according to claim 1, further comprising a prism holder for supporting the conical prism wherein an entirety of the conical prism and the prism holder is disposed on one side of the housing and connected with the housing by the translucent columns.

4. The laser line generating device according to claim 3, wherein the prism holder is a cylinder.

5. The laser line generating device according to claim 4, wherein the housing is a cylinder concentric with the prism holder.

6. The laser line generating device according to claim 1, wherein the translucent columns are formed of optical glass.

7. The laser line generating device according to claim 5, wherein the translucent columns are configured as rectangular blocks.

8. The laser line generating device according to claim 7, wherein a surface with a maximum area of the rectangular blocks of the translucent columns is parallel to the central axis of the conical prism.

9. The laser line generating device according to claim 7, wherein the translucent columns are located at the edge of the prism holder.

10. The laser line generating device according to claim 9, wherein the surface with the minimum area of the rectangular blocks of the translucent columns is perpendicular to the central axis of the conical prism.

11. The laser line generating device according to claim 10, wherein a number of the translucent columns is four.

* * * * *